(12) United States Patent
Mehta (10) Patent No.: US 8,044,821 B2
(45) Date of Patent: Oct. 25, 2011

(54) DOWNHOLE DATA TRANSMISSION APPARATUS AND METHODS

(75) Inventor: Shyam B. Mehta, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1323 days.

(21) Appl. No.: 11/464,867

(22) Filed: Aug. 16, 2006

(65) Prior Publication Data

US 2007/0057811 A1 Mar. 15, 2007

Related U.S. Application Data

(60) Provisional application No. 60/716,180, filed on Sep. 12, 2005.

(51) Int. Cl.
*G01V 3/00* (2006.01)
(52) U.S. Cl. .................................. 340/855.7; 340/855.5
(58) Field of Classification Search ............... 340/855.7, 340/853.1, 855.5; 367/82
See application file for complete search history.

(56) References Cited

U.S. PATENT DOCUMENTS

| | | | |
|---|---|---|---|
| 4,739,325 A * | 4/1988 | MacLeod | 340/854.4 |
| 5,517,464 A | 5/1996 | Lerner et al. | |
| 5,624,051 A | 4/1997 | Ahern, Jr. et al. | |
| 6,641,434 B2 | 11/2003 | Boyle et al. | |
| 2004/0075566 A1 | 4/2004 | Stepanik et al. | |
| 2005/0046592 A1 * | 3/2005 | Cooper et al. | 340/855.7 |
| 2005/0109097 A1 * | 5/2005 | Bogath et al. | 73/152.49 |
| 2005/0168349 A1 | 8/2005 | Huang et al. | |
| 2005/0285751 A1 | 12/2005 | Hall et al. | |
| 2006/0220650 A1 * | 10/2006 | Lovell et al. | 324/357 |
| 2006/0256718 A1 | 11/2006 | Hall et al. | |
| 2008/0120036 A1 * | 5/2008 | Kimminau et al. | 702/12 |

FOREIGN PATENT DOCUMENTS

| | | |
|---|---|---|
| RU | 1564579 | 5/1990 |
| RU | 2172557 | 6/1999 |
| RU | 2236754 | 9/2004 |
| SU | 1087082 | 2/1978 |
| SU | 783825 | 11/1980 |
| SU | 1432559 | 10/1988 |
| SU | 1453605 | 1/1989 |
| WO | 2004085796 | 10/2004 |

* cited by examiner

*Primary Examiner* — Timothy Edwards, Jr.
(74) *Attorney, Agent, or Firm* — John Vereb; Jeremy Welch (57) ABSTRACT

Example wellbore telemetry systems and methods for transmitting signals between a surface unit and a downhole tool are disclosed. One example method transmits data between a downhole location in a wellbore and a surface location associated with the wellbore by measuring downhole data via at least one downhole component and generating a data frame containing at least a portion of the downhole data. The example method varies a telemetry bandwidth allocated to the at least one downhole component in response to the at least some of the downhole data corresponding to a special event and transmits the at least some of the downhole data to the surface location via the telemetry bandwidth allocated to the at least one downhole component.

37 Claims, 4 Drawing Sheets

DOWNHOLE DATA TRANSMISSION APPARATUS AND METHODS

RELATED APPLICATION

This patent claims the benefit of the filing date of U.S. Provisional Patent Application No. 60/716,180, the entire disclosure of which is incorporated herein by reference.

FIELD OF THE DISCLOSURE

The present disclosure relates to telemetry systems and methods for use in wellbore operations. More particularly, the present disclosure relates to wellbore telemetry systems and methods for transmitting signals between a surface unit and a downhole tool.

BACKGROUND

Wellbores may be drilled to locate and produce hydrocarbons, minerals, or water. The drill string and the downhole tool are typically composed of a series of pipes threadably connected together to form a long tube with a drill bit at the lower end thereof. As the drilling tool is advanced, drilling mud is pumped from a surface mud pit through a passage or passages in the drilling tool and out the drill bit. The mud exiting the drill bit flows back to the surface to be returned to the mud pit and may be re-circulated through the drilling tool. In this manner, the drilling mud cools the drilling tool, carries cuttings and other debris away from the drilling tool, and deposits the cuttings and other debris in the mud pit. As is known, in addition to the cooling and cleaning operations performed by the mud pumped into the wellbore, the mud forms a mudcake that lines the wellbore which, among other functions, reduces friction between the drill string and subterranean formations.

During drilling operations, communications between the bottom hole assembly (which may include a plurality of components) and a surface-based processing unit and/or other surface devices may be performed using a telemetry system. In general, such telemetry systems enable the conveyance of power, data, commands, and/or any other signals or information between the bottom hole assembly and the surface devices. Thus, the telemetry systems enable, for example, data related to the conditions of the wellbore and/or the bottom hole assembly to be conveyed to the surface devices for further processing, display, etc. and also enable the operations of the bottom hole assembly to be controlled via commands and/or other information sent from the surface device(s) to the bottom hole assembly.

Various wellbore telemetry systems may be used to establish the desired communications capabilities. Examples of such systems may include a mud pulse telemetry system as described in U.S. Pat. No. 5,517,464, a wired drill pipe wellbore telemetry system as described in U.S. Pat. No. 6,641,434, an electromagnetic wellbore telemetry system as described in U.S. Pat. No. 5,624,051, an acoustic wellbore telemetry system as described in PCT Patent Application No. WO2004085796, all of which are incorporated by reference herein in their entireties. Further examples using data conveyance or communication devices (e.g., transceivers coupled to sensors) have also been used to convey power and/or data between a bottom hole assembly and a surface unit.

Telemetry systems typically involve transmitting data captured by a bottom hole assembly (e.g., one or more components composing a bottom hole assembly) to a surface system or unit. With these systems, data is typically collected and organized in packets, which may be referred to as frames, containing one data point or multiple data points. The data is typically transmitted uphole in a constant or continuous data stream. For example, a set of data collected from individual components is gathered into frames and conveyed to the surface. Data from a frame is continuously sent to the surface until all of the data from that frame has been sent. A series of frames containing interleaved data from various components is typically sent uphole to the surface. The above-described process is repeated for a given set of frames and/or may be repeated continuously (e.g., until power is turned off). Telemetry components or systems typically have practical limitations (e.g., bandwidth) that restrict the data rate and/or the amount of data that can be transmitted uphole in a given time period. As a result, there are often delays sending data from the bottom hole assembly to the surface and/or receiving data at the surface. Additionally, repeated data often consumes the limited available telemetry bandwidth, thereby slowing or preventing the transmission of data relating to key information and/or important events.

SUMMARY

As set forth in the detailed description below, the example methods and apparatus described herein enable telemetry systems to transmit data frames in a more efficient manner and/or a manner that facilitates the flow of data. In particular, the transmission of certain data may be triggered in response to detection or activation of special events. Further, the example methods and apparatus described below may selectively prioritize the transmission of data or frames such that information pertaining to special events (e.g., alerts relating to problematic downhole conditions) is more effectively (e.g., more quickly) or efficiently (e.g., via better use of available bandwidth) sent uphole than possible with many known telemetry systems. Additionally, the example methods and apparatus described below may be used to enable and facilitate downhole and/or surface real time transmission decisions.

In accordance with one disclosed example a method of transmitting data between a downhole location in a wellbore and a surface location associated with the wellbore measures downhole data via at least one downhole component and generates a data frame containing at least a portion of the downhole data. The example method may also vary a telemetry bandwidth allocated to the at least one downhole component in response to the at least some of the downhole data corresponding to a special event and transmit the at least some of the downhole data to the surface location via the telemetry bandwidth allocated to the at least one downhole component.

In another disclosed example, an apparatus to transmit data between a downhole location in a wellbore and a surface location associated with the wellbore, includes a telemetry component configured to vary a telemetry bandwidth allocated to at least one downhole component in response to at least some downhole data corresponding to a special event. The telemetry component may also transmit the at least some of the downhole data to the surface location via the telemetry bandwidth allocated to the at least one downhole component.

In yet another disclosed example, a method of transmitting data between a downhole location in a wellbore and a surface location associated with the wellbore periodically generates a plurality of data frames of a first type to be transmitted between the downhole location and the surface location. The method may also generate a data frame of a second type in response to detection of a special event and asynchronously transmitting the data frame of the second type.

DETAILED DESCRIPTION

Certain examples are shown in the above-identified figures and described in detail below. In describing these examples, like or identical reference numbers are used to identity common or similar elements. The figures are not necessarily to scale and certain features and certain views of the figures may be shown exaggerated in scale or in schematic for clarity and/or conciseness.

Figure 1:
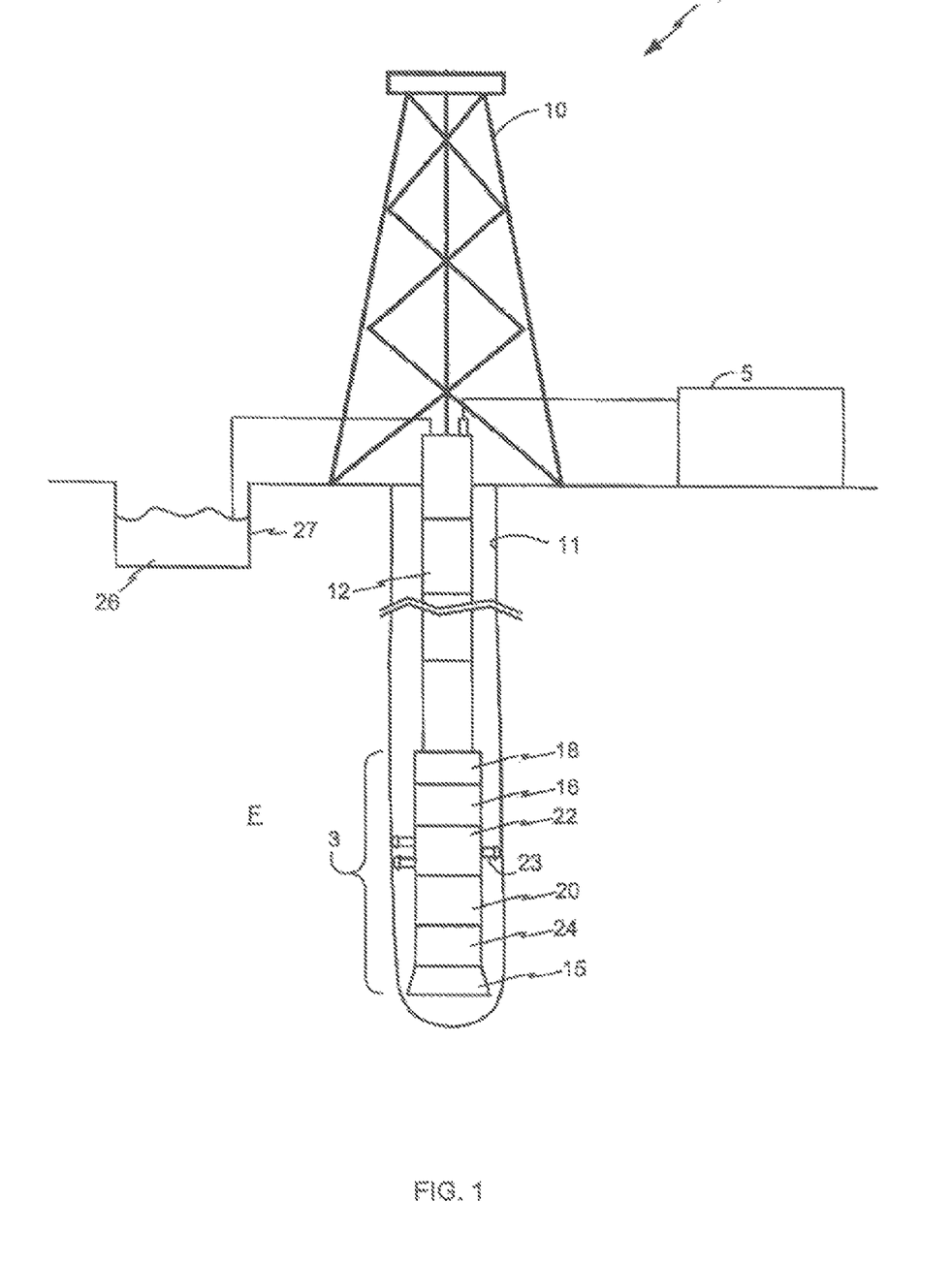
FIG. 1 is a schematic view, partially in cross-section, of an example wellsite having a surface system or unit and bottom hole assembly deployed from a rig and into a wellbore via a drill string having a telemetry system therein.

FIG. 1 depicts an example wellsite system 1 that may advantageously incorporate the example telemetry apparatus and methods described herein. In the illustrated example, a borehole 11 may be formed by a well-known rotary drilling process, mud-motor based directional drilling, or any other suitable drilling process or processes. Further, while the example system 1 is depicted as implemented with a land-based rig, the example method and apparatus described herein may be used in connection with non-land based rigs. Still further, while the example system 1 of FIG. 1 is depicted as including a downhole drilling tool, any other suitable downhole tool such as, for example, a wireline, coiled tubing, casing drilling, completions or other downhole tool having a telemetry system in communication with a surface system or unit could be used instead.

The example wellsite system 1 of FIG. 1 includes a downhole tool or bottom hole assembly (BHA) 3 that is suspended in the borehole 11 via a drill string 12 and which has a drill bit 15 at its lower end. The example system 1 includes a land-based platform and derrick assembly 10 that is positioned over the borehole 11, which penetrates a subsurface formation F. The system 1 further includes drilling fluid or mud 26, which is stored in a pit 27 formed at the wellsite. The drilling fluid 26 is pumped into the interior of the drill string 12 via a mud pump (not shown), thereby causing the drilling fluid 26 to flow downward through the drill string 12. The drilling fluid 26 exits the drill string 12 via ports in the drill bit 15 and carries formation cuttings up to the surface as the drilling fluid 26 is returned to the pit 27 for recirculation.

The BHA 3 includes several components capable of performing various downhole functions. In the example system 1 of FIG. 1, the BHA 3 includes a measurement while drilling (MWD) component 16, a telemetry component 18, a logging while drilling (LWD) component 20, a formation evaluation component 22, and a rotary steerable (RS) component 24. However, any combination of one or more of each of these components or different components may be used instead.

The surface system or unit 5 may be implemented using any desired combination of hardware and/or software. For example, a personal computer platform, workstation platform, etc. may store on a computer readable medium (e.g., a magnetic or optical hard disk, random access memory, etc.) and execute one or more software routines, programs, machine readable code or instructions, etc. to perform the operations described herein. Additionally or alternatively, the surface unit 5 may use dedicated hardware or logic such as, for example, application specific integrated circuits, configured programmable logic controllers, discrete logic, analog circuitry, passive electrical components, etc. to perform the functions or operations described herein.

Still further, while the surface unit 5 is depicted in the example of FIG. 1 as being relatively proximate to the drilling rig, some part of or the entire surface unit 5 may alternatively be located relatively remotely from the rig. For example, the surface unit 5 may be operationally and/or communicatively coupled to the wellbore telemetry component 18 via any combination of one or more wireless or hardwired communication links (not shown). Such communication links may include communications via a packet switched network (e.g., the Internet), hardwired telephone lines, cellular communication links and/or other radio frequency based communication links, etc. using any desired communication protocol.

The telemetry component 18 may be used to convey signals between the BHA 3 and a surface system or unit 5. Any desired type of telemetry component or combination of telemetry components may be used such as, for example, mud pulse telemetry components, electromagnetic telemetry components, wired drill pipe telemetry components, acoustic telemetry components, retrievable wireline induction coupling, etc. The MWD component 16 may be used to obtain downhole measurements such as, for example, direction, inclination, weight on bit, gamma ray, and/or any other measurement(s) and send those measurements to the surface unit 5 via the telemetry component 18.

As depicted, the formation evaluation component 22 is a formation testing or sampling component having a probe 23 for establishing fluid communication with the formation F and drawing fluid into the formation evaluation component. Various measurements of the fluid may be made and data relating thereto may be transmitted to the surface via the telemetry component 18.

The LWD component 20 may be used to obtain measurements and collect downhole data such as, for example, resistivity, nuclear, gamma ray, porosity, density, sonic, seismic, acoustic, etc. The measurements obtained by the LWD component 20 may be stored in a memory unit (not shown) within the LWD component 20 so that when the LWD component 20 retrieved to the surface, data related to the measurements may be downloaded to a processing unit, computer, etc. for analysis. Alternatively or additionally, at least some of the measurements or a portion of the data collected by the LWD component 20 may be transmitted to the surface via the telemetry component 18.

The RS component 24, or any other suitable component, may be used to steer the bit 15 in a desired direction. In this manner, the BHA 3 may be advanced along a desired course or path to a desired downhole location. The RS component 24 may also collect data that may be transmitted or conveyed to the surface via the telemetry component 18.

More generally, the BHA 3 may be composed of additional and/or different components and data collected by these components may be conveyed or transmitted between the components (e.g., before transmission to the surface) and/or stored in one or more locations downhole (e.g., within one or more devices or components associated with the BHA 3). Further, one or more of the components of the BHA 3 may include one or more processors or processing units (e.g., a microprocessor, an application specific integrated circuit, etc.) to manipulate and/or analyze data collected by the components.

Streams of data may be generated by the components of the BHA 3 and may be manipulated and/or buffered within the components. The telemetry component 18 may selectively collect, gather, or capture data and create frames of data from one or more of the components based on, for example, a predetermined frame definition, and/or the data captured by the telemetry component 18 may be conveyed using a frame or frames having a self-defining data stream (e.g., the data stream contains information indicative of the manner in which the information or data within the data stream is arranged or organized). The use of a self-defining data stream enables data frames to be decoded without having to reference a predetermined frame format.

In addition to selectively obtaining data and creating frames from the various components associated with the BHA 3, the telemetry unit 18 may selectively send the generated frames to the surface unit 5 at particular times, in a particular order or sequence, etc. to achieve a desired result. For example, as described in greater detail below, certain frames containing information relating to special events for which is would be advantageous to convey the information relating thereto to the surface without delay may be conveyed on a priority basis. In particular, in some cases, a frame containing such special event information may be conveyed prior to one or more other frames even if the data in the other frames was collected or otherwise obtained prior to the time at which the special event information was collected or otherwise obtained.

While the example system 1 of FIG. 1 is depicted as a single wellsite having one surface unit 5 and one bottom hole assembly 3 with five specific components, one or more surface units at one or more wellsites, each of which may use any desired combination of downhole components, may be used in connection with the example apparatus and methods described herein. The transmission or conveyance of data or information between the surface unit 5 and the downhole tool 3 may be performed using any of a variety of techniques. For example, the surface unit 5 may send commands to one or more components of the bottom hole assembly 3 in response to information received from the bottom hole assembly 3. Additionally, the communications between the bottom hole assembly 3 and the surface unit 5 may be simultaneous, interleaved, continuous, and/or intermittent.

An operator or other person is typically positioned at or proximate to the surface unit 5 to monitor (e.g., via a video monitor that displays data received from downhole) the operations at wellsite. Typically, the operator views a screen that displays a set of data, which may be continuously updating, from various downhole and surface components. The operator or other person can alternatively be positioned remotely (e.g., off rig site) anywhere in the world. In that case, communications between the remote location and the wellsite may be performed using any combination of hardwired and/or wireless communication systems. For example, such communications may be performed using any desired combination of telephone lines, Internet communication links, cellular communication links, satellite communication links, etc.

Figure 2:
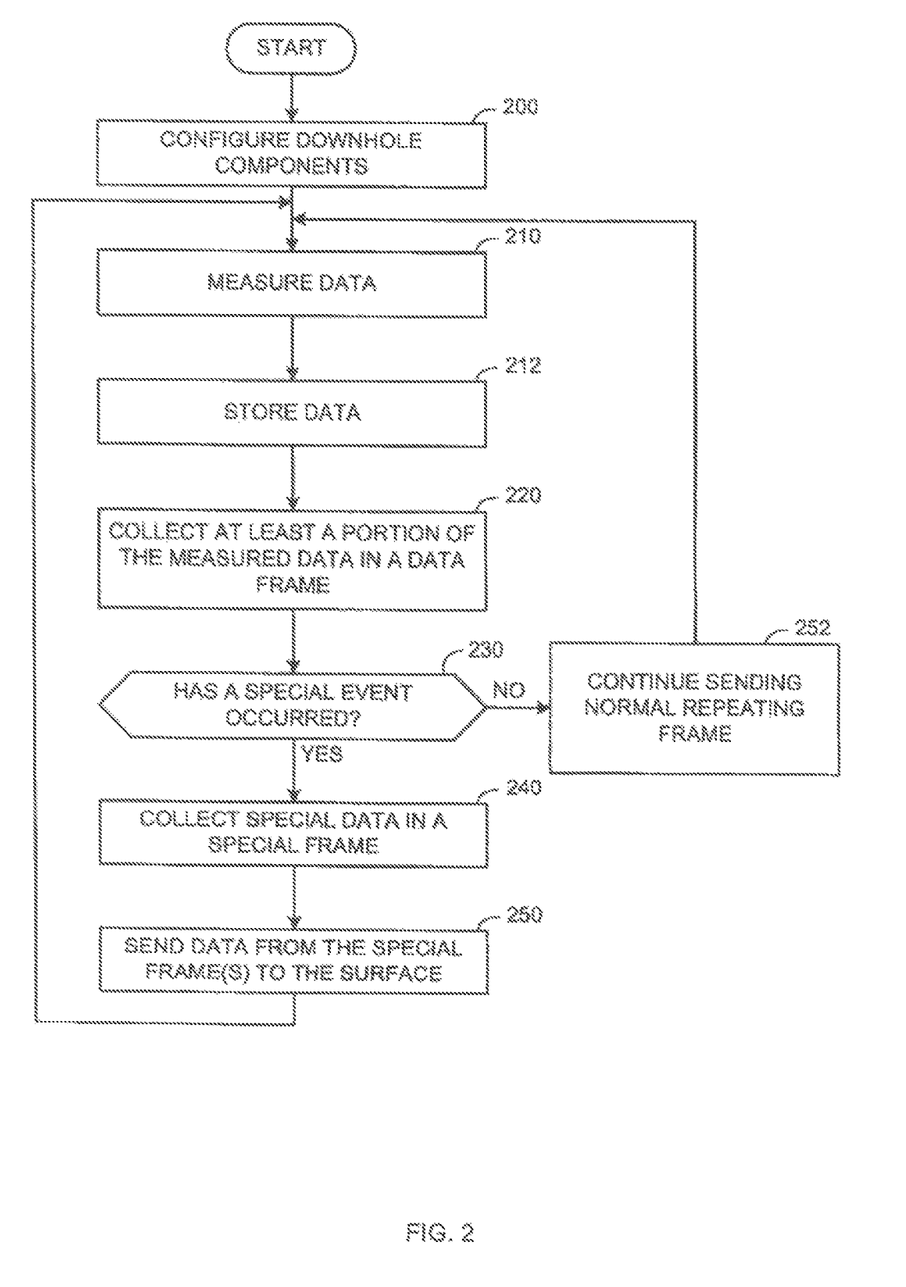
FIG. 2 is a flow diagram depicting an example method of transmitting data between a bottom hole assembly and a surface system or unit.

FIG. 2 is a flow diagram depicting an example process or method of transmitting data between a bottom hole assembly (e.g., the bottom hole assembly 3 of FIG. 1) and a surface system or unit (e.g., the surface system or unit 5 of FIG. 1). Before discussing the example method of FIG. 2, it should be understood that the various operations depicted in FIG. 2 may be performed via software, machine readable instructions, code, etc. Such software, machine readable instructions or code may be stored on a computer readable medium (e.g., a magnetic memory media, an optical memory media, etc.) and executed by a processor (e.g., a microprocessor) to perform one or more of the operations depicted in FIG. 2. Further, if desired, one or more of the operations depicted in FIG. 2 may be performed automatically or manually, the order of the operations may be changed, one or more of the operations may be eliminated, and/or the operations may be sub-divided into additional or different blocks than those depicted in FIG. 2.

Now returning to FIG. 2 in detail, the example process initially configures the components of the BHA 3 to enable data collection and/or transmission in desired manners (block 200). In particular, each of the components making up the BHA 3 may be configured to acquire data at a particular rate or frequency and/or to store the acquired data in a particular manner (e.g., to store data in the component that collects the data, in another component, etc.). Additionally, other specifications or parameters such as, for example, measurement coefficients may be set or configured based on wellbore conditions such as mud type, hole size, formation type, etc. Any telemetry component (e.g., the telemetry component 18 of FIG. 1) may be configured to generate and transmit a set of predefined or intelligently composed frames. Such frame configuration or set up determines the quantity, type, frequency, frame sequence (e.g., the order in which certain types of frames are conveyed), the frequency and sequence or order in which data is collected from the various downhole components and placed in frames, etc.

As described in greater detail below, the predefined or intelligent frame composition may be suited to facilitate the efficient and rapid conveyance of certain types of information to the surface. For example, the information relating to special events such as those downhole conditions (e.g., alarm or alert conditions, problems, formation pressure while drilling information, etc.) requiring immediate attention by the person monitoring a drilling process or operation may be conveyed in specially formed frames that are conveyed to the surface in an expedited manner.

Following configuration of the downhole components (block 200), one or more of the downhole components collect or measure downhole data (block 210). Such collected data may be stored in the component that collects the data and/or in another downhole component or multiple other downhole components (block 212). At block 212, the data may be transferred to a telemetry component or components (e.g., the telemetry component 18) in accordance with the above-mentioned frame configuration.

During normal operation, a stream of data may be measured or collected by each of the downhole components (e.g., one or more of the downhole components 18, 20, 22, and 24). As noted above, such measured or collected data may be stored within the component collecting the data and/or other downhole components. The telemetry component (e.g., the telemetry component 18) then selectively collects or gathers at least some of the data collected or measured at block 210 from one or more of the downhole components in accordance with the predefined or intelligently composed frame configuration established at block 200 (block 220).

Following data collection at block 220, the example method of FIG. 2 determines if a special event has occurred (block 230). A special event may be an event that does not occur regularly (e.g., a non-periodic event, a non recurring event or condition, etc.). For example, an error or malfunction associated with one of the downhole components, the collection of predefined data such as a high temperature, a formation pressure reading, etc., the activation of certain downhole components (e.g., as a result of one or more surface commands), and/or a special data frame may be associated with a special event at block 230.

In another example, a special event may be a recurring or periodic event for which it is desired that the data be transmitted up-hole on a priority basis. For example, a special event may correspond to a particular measurement, such as a formation pressure while drilling measurement, that is taken on a periodic basis. Generally, such a measurement is made when the drill string is not being rotated, such as during a connection, and the entire bandwidth of telemetry may be dedicated to transmitting the data from the formation pressure while drilling measurement.

The occurrence of a special event at block 230 may be determined in response to interruption of a telemetry component by one or more of the downhole components to alert when some predetermined criteria have been met. Such interruption of the telemetry component may be implemented so that the various downhole components send signals to the telemetry component (e.g., the telemetry component 18) to indicate that a special event has occurred. Alternatively or additionally, the telemetry component may be configured to send queries to (e.g., poll) the downhole components to request or detect the occurrence of special events. In one example, the detection of special events at block 230 may enable the conveyance of a data frame containing formation evaluation information or data to be transmitted or conveyed to a surface unit or system substantially immediately following the measurement or collection of formation evaluation information or data by a formation evaluation component (e.g., the formation evaluation component 22 of FIG. 1).

If the occurrence of a special event is detected at block 230, the example method collects or arranges some or all of the special data associated with the special event in a special data frame or multiple special data frames (block 240). The arrangement of the special data within the special data frame(s) may be based on the configuration parameters established at block 200. After the special data has been collected in a special data frame or multiple special data frames at block 240, the special frame(s) of data may be conveyed or transmitted to the surface in accordance with the configuration of block 200 (block 250). After the special data frames have been sent to the surface at block 250, control returns to block 210 to enable the measurement/data collection and transmission process to repeat. All of the data in a special frame may be collected before the transmission of the special frame as depicted in FIG. 2 or, alternatively, the data can be collected as needed for transmission, thereby providing the most current data for transmission.

If the example method determines that a special event has not occurred at block 230, the method continues to send normal (i.e., non-special) repeating frames of data (e.g., periodically transmitted data frames) (block 252). Control then returns to block 210 to enable the method to repeat the collection or measurement and transmission of downhole data.

As noted above, special events can be manually and/or automatically triggered by the example apparatus and methods described herein. The signaling or assertion of a special event may, in some implementations, be time limited such that after some predetermined time period the need to convey the information relating to the special event may expire. Additionally or alternatively, the duration for which a special event is asserted as requiring further processing may be based on the completion of a task or other event such as, for example, use of a component to perform a measurement. Further, the duration for which a special event trigger may be asserted may be changed (e.g., increased/decreased) manually and/or automatically based on other succeeding triggers for special events.

Figure 3:
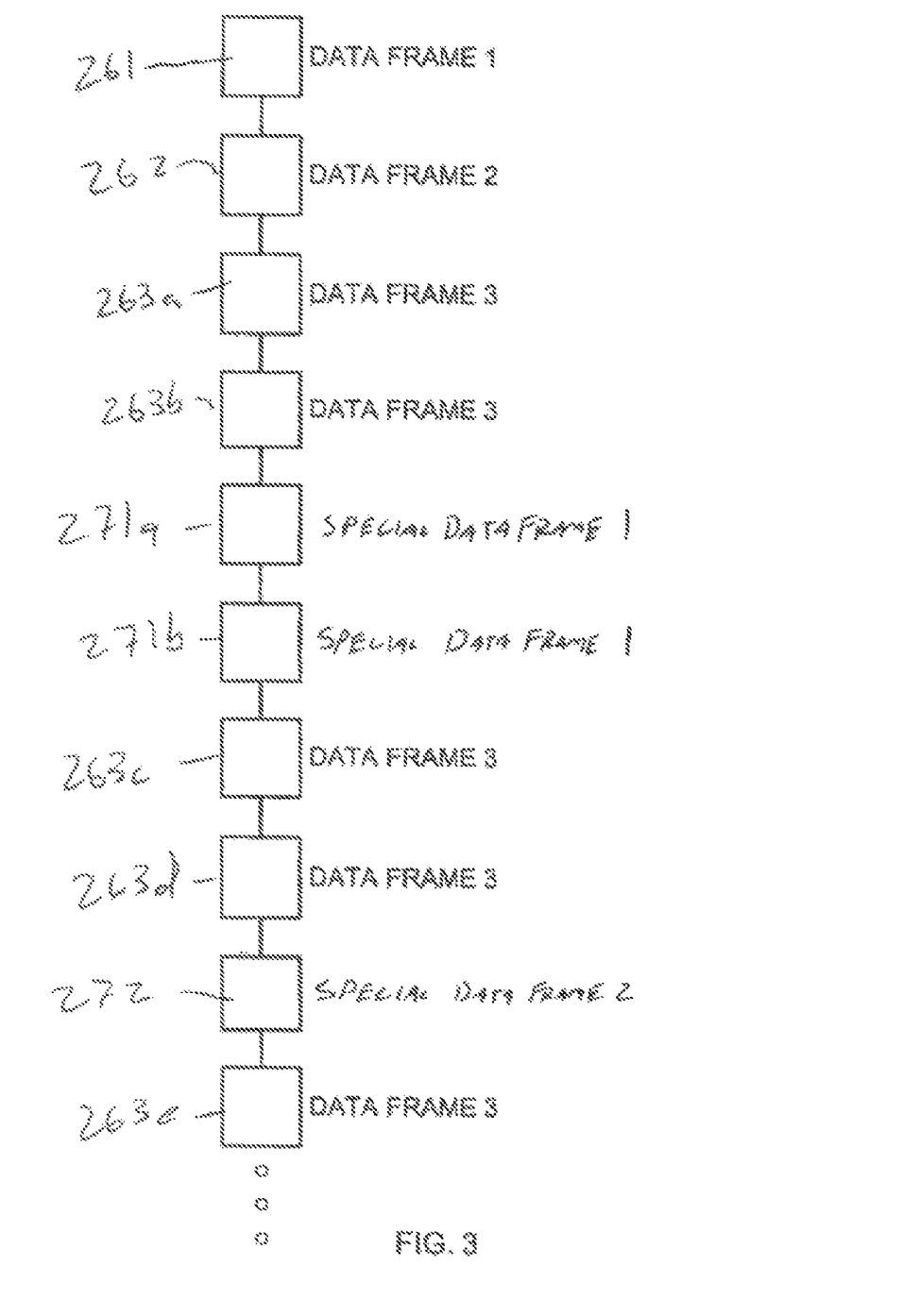
FIG. 3 depicts an example series of frames containing data transmitted between a bottom hole assembly and a surface system or unit.

FIG. 3 is a schematic diagram of an example series of frames containing data transmitted between a bottom hole assembly and a surface system or unit. The example series of data frames of FIG. 3 represents one manner in which the example process of FIG. 2 may send special data (block 250 of FIG. 2) to a surface unit or system. In the example of FIG. 3, three types of data frames (indicated as data frames 1, 2, and 3) are conveyed or transmitted in a manner that enables the efficient and expeditions conveyance of special data frames (indicated as special data frames 1 and 2) containing special data to the surface. While three types of data frames are depicted in the example of FIG. 3, it should be recognized that more or fewer types of data frames may be used instead.

In the example of FIG. 3, the configuration (e.g., the configuration at block 200 of FIG. 2) provides that one data frames of type 1 (261) is sent first, followed by one data frame of type 2 (262), followed by five data frames of type 3 (263*a-e*). In one example, data frame 1 (261) represents a survey frame. It is common practice to program tools to take measurements related to the direction and inclination of the BHA while drilling and the mud flow have been stopped. This provides a more accurate measurement of the direction and inclination of the BHA. Once the mud pumps have been restarted, an MWD tool may be programmed to transmit a survey frame to the surface.

In another example, data frame type 2 (262) may represent a utility frame that includes a status word for each of the tools in the BHA. In one particular example, a status frame may include data related to temperature in the borehole around the BHA.

In another example, data frame type 3 (263*a-e*) may represent data from one or more of the tools in the BHA. An MWD tool may poll the individual tools to obtain a data point for each, and then transmit at least some of the collected data in a data frame. The MWD tool may then repeat the process by again polling one or more tools in the BHA, and then collect and transmit at least some of the collected data. The repetition of such a data frame may continue indefinitely.

The configuration further provides that upon the detection of the occurrence of a special event (e.g., at block 230 of FIG. 2) and the collection of a special data frame (e.g., at block 240 of FIG. 2), the special data frame is conveyed or transmitted by the telemetry component (e.g., the component 18) to the surface unit (e.g., the surface unit 5) on a priority basis, immediately following the completion of transmitting a type 3 data frame. In particular, the special data frame 1 271*a* may be collected or formed while the second data frame of type 3 (263*b*) is being transmitted and, thus, the special data frame 1 (271*a*) is transmitted to the surface unit immediately following the completion of the transmission of the second data frame of type 3 (263*b*).

In one example, special data frame 1 271*a-b* may correspond to formation pressure while drilling measurements.

Because of the relative importance of this type of data, and the relative inactivity of other tools in the BHA, the MWD tool transmits the special data frame 1 271*a* on a priority basis. The MWD tool may transmit a second special data frame 1 271*b*, representing a continuing stream of special data. For example, the second special data frame 1 271*b* may represent continuing data from a formation pressure while drilling measurement. The MWD tool may repeat special data frame 1 and the continuing data until the special event no longer persists. For example, the MWD tool may continue to transmit special data frame 1 until a formation pressure while drilling measurement is completed and the data has been transmitted to the surface. Upon completion of the special event, the MWD tool may resume transmitting data frame 3 263*c*.

The data in a special data frame may correspond to data from other types of tools. For example, data from a seismic receiver, an electromagnetic sensor in a surface to borehole application, and feed back from a rotary steerable system may all form a special data frame. A special data frame may include combinations of data from more than one measurement. Other examples of special data frames that do not depart from the scope of the invention will be apparent to those having ordinary skill in the art.

The special data frame 2 272 may be formed during the transmission of the fourth data frame of type 3 263*d* and, thus, is transmitted immediately following the transmission of the fourth data frame of type 3 263*d*. The special data frame 2 may correspond to an alert or an alarm that requires attention by an operator. For example, special data frame 2 272 may correspond to a change in the status of a particular tool. In another example, special data frame 2 272 may correspond to a particular measurement that is out of an expected range, such as drill bit temperature or borehole pressure. Other examples of alert or alarm conditions will be apparent to those having ordinary skill in the art.

Thus, the special data frames 1 and 2 (271*a*-*b*, 272) are transmitted to the surface on a priority basis. In one example, the special data frames are transmitted substantially immediately upon completion of forming of the special frames. In another example, the transmission of the special data frames commences even before the entire special data frame is formed. Thus, the first portion of a special data frame may be transmitted while the remainder of the data frame is being collected and compiled.

Figure 4A:
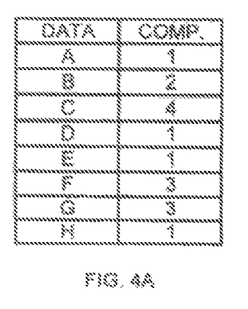
FIG. 4A is an example chart depicting a special frame of data collected by a bottom hole assembly.

FIG. 4A is an example chart depicting an example of special data collected by a bottom hole assembly (e.g., the BHA 3 of FIG. 1) according to configuration (block 200 of FIG. 2). As shown in FIG. 4A, a special frame of data is collected (e.g., at block 240 of FIG. 2) from a plurality of downhole components in response to the occurrence of a special event. The data in the example chart of FIG. 4A is configured as defined in, for example, a telemetry component (e.g., the telemetry component 18 of FIG. 1). In the example of FIG. 4A, data has been collected for downhole components 1, 2, 3, and 4 in response to the detection of a special event.

Figure 4B:
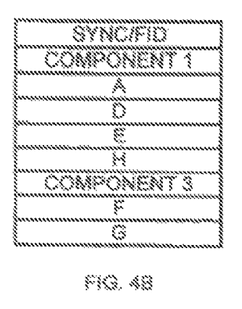
FIG. 4B is an example chart depicting special data extracted from the example data frame of FIG. 4A for transmission to a surface system or unit.
Figure 4C:
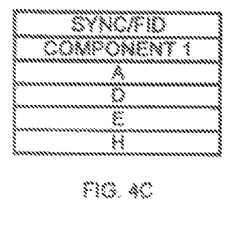
FIG. 4C is another example chart of special data extracted from the example data frame of FIG. 4A for transmission to a surface system or unit.

FIGS. 4B and 4C are example charts depicting special data extracted from the example special frame of data of FIG. 4A for transmission to a surface system or unit (e.g., the surface system of unit 5 of FIG. 1). In the particular example of FIG. 4B, each row represents a word that is transmitted to the surface. Thus, FIG. 4B shows a synchronization word, a component identifier word, and 4 data words representing data from the identified component (in this case, component 1). The data from the first component is followed by a second component identifier word and data from the second identified component.

In FIG. 4C, the data A, D, E, and H for a component 1 has been extracted for conveyance or transmission to the surface unit (e.g., the surface unit or system 5 of FIG. 1). Preferably, but not necessarily, the extracted data is conveyed in the order in which it appears in the example chart (i.e., from top to bottom) of FIG. 4A to facilitate identification of the data (e.g., the source of the data) at the surface. The extracted data may also be accompanied by or may include an identifier to identify the data and/or the type of component that collected the extracted data. The frame may also begin with a synchronization word and a frame identifier to identify the frame conveying the extracted data as a special frame.

Although the example chart of FIG. 4B depicts the synchronization information and frame identifier as one word, multiple words could be used instead. Also, while the data in the example of FIG. 4B is depicted as being transmitted as individual data points, the data may alternatively or additionally be sent in using any uncompressed or compressed data format.

FIG. 4C is another example chart of special data extracted from the example data frame of FIG. 4A for transmission to a surface system or unit. In the example of FIG. 4C, extracted data or information associated with a component e.g., component 1) may be sent to the surface as needed by the special event and/or multiple special events.

Figure 5A:
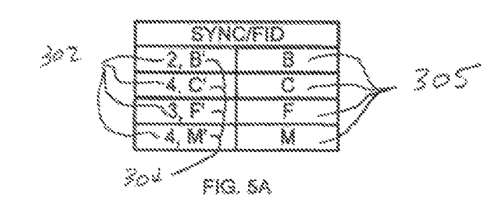
FIGS. 5A and 5B are example charts depicting special data preceded by the identification for the data, which may optionally be included in the example data frame of FIG. 4A for transmission to a surface system or unit.
Figure 5B:
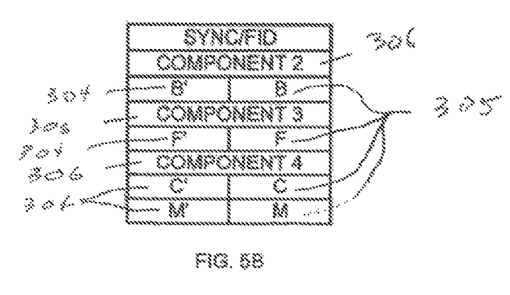

FIGS. 5A and 5B are example charts depicting special data preceded by the identification for the data, which may optionally be included in a special data frame for transmission to a surface system or unit. In the example encoding scheme of FIG. 5A, each data value 305 is preceded by an identifier composed of a corresponding component number 302 (i.e., the component associated with the collected data) and a measurement identifier 304 (e.g., B', C', F', M', etc.).

In the example encoding scheme of FIG. 5B, a component identifier 306 is sent and followed by a word that includes the measurement identifier 304 and the data values 305. Thus, measurement identifiers (e.g., B', F', C', M', etc.) can be sent to identify the individual data points as shown in FIG. 5B and the need to include the component identifier with each data value or point is eliminated. Further, the example frame coding schemes of FIGS. 5A and 5B eliminate the need to send data in a particular order or sequence (e.g., a predefined frame sequence) to enable identification of the component corresponding to the data at the surface unit or system. As a result, with the example frame coding schemes of FIGS. 5A and 5B, the downhole component can send data to the surface as needed to enable an operator to make critical decisions in a timely manner.

More generally, the encoding scheme used to generate data frames can be defined on the surface prior to tripping in the wellbore, constructed or defined downhole via special downlinking and/or based on the number of components performing measurements at about the same time, and/or modified when the component is downhole.

Regardless of the data frame encoding scheme (e.g., the manner in which the data is organized, formatted, etc.) to convey the data to a surface unit, the surface unit retrieves the extracted data and uses knowledge of the encoding algorithm or scheme to identify the data. Once the surface unit has identified the data, the surface unit can manipulate or otherwise analyze or process the data, which may, for example, be provided (e.g., displayed) to an operator in real time. In this manner, the operator can respond to some or all of the data by, for example, sending commands to one or more of the downhole components.

In operation, the operator may receive the data in the order set forth in the example data frame transmission scheme shown in FIG. 3. For example, the operator may receive data relating to data frame type 1, which represents data from one of more components such as a survey tool that generates stationary survey data. Once the data frame type 1 has been conveyed or transmitted, the data frame type 2 conveys data from one or more components such as, for example, an MWD component, an LWD component, etc. that may not be required on a regular (e.g., periodic) basis. Once the data from the data frame type 2 has been conveyed to the surface, the data associated with the data frame type 3 is then conveyed to the surface.

As depicted in FIG. 3, a plurality of data frame type 3 are conveyed to the surface, where each set of data frame type 3 includes freshly acquired data as the drilling process progresses. Type 3 data frames may contain measurement and/or other data. Additionally, type 3 data frames may be limited in size such that more than one such frame may be needed to convey larger portions of data. For example, a block of data from one or more components may be sent uphole in one or more frames.

Due to an alert or special event, special data frames are sent in between the series of type 3 data frames. As a result, a special data frame containing, for example, information or downhole data requiring the urgent attention of an operator at the surface can be communicated uphole. In contrast, some known systems can lose such special event data due to latency in the uphole communication techniques used by these systems. Alternatively or additionally, these known systems may only send such special event data uphole in response to a system reset and/or may intersperse such special data within non-special data frames (e.g., type 3 data frames), thereby making inefficient use of available telemetry bandwidth. Again, in contrast to the aforementioned communication techniques, the example apparatus and methods described herein enable the formation and transmission of special frames of data upon the occurrence of special events. Such frames are sent, as needed, and typically immediately following the completion of transmission of another data frame (e.g., a predetermined data frame type) so that the information pertaining to the special events are provided to an operator at the surface as soon as possible.

The foregoing example apparatus and methods may be modified in many manners to achieve the same or similar results. For example, special data frames may be conveyed using the techniques described herein from the surface to the downhole component and/or from the downhole component to the surface. Further, the example apparatus described herein may be manually and/or automatically activated to perform the desired operation. The activation may be performed as desired and/or based on data generated, conditions detected, and/or analysis or results from downhole operations.

The selective passage of data from one or more downhole components to the surface may be used to manipulate bandwidth. In other words, the communications bandwidth of the telemetry component allocated to the various downhole components may be varied or modified as special events are detected and special data frames containing information relating thereto are asynchronously (e.g., as needed and/or as the special event occur) transmitted to the surface at times during which other predetermined data frames would otherwise be transmitted to the surface. In other words, the priority transmission of the special data frames enables special data to be transmitted to the surface out of order (i.e., in an order or sequence different from the order in which all downhole data is collected) such that the special data may be sent ahead of or in front of data collected prior to when the special data was collected. Special events may be either triggered from the surface (e.g., manually by an operator and/or automatically via software) and/or via one or more downhole components upon the occurrence of a special event (e.g., a predetermined set of conditions). Information sent downhole may be conveyed to, for example, one or more downhole tools or components using any desired method of downlinking.

In some implementations, some downhole components will, at times, send more or less information to the surface (e.g., during station logging). Instead of having a fixed bandwidth allocation, the example methods and apparatus described herein may vary the telemetry bandwidth allocated to the downhole components based on the operational conditions downhole to make the best use of available telemetry bandwidth. For example, in the case of a special event, the component or components having information pertaining to the special event are enabled to quickly transmit (e.g., temporarily received additional telemetry bandwidth) to the surface for further processing (e.g., to enable an operator at the surface to take responsive action). Further, such variation of telemetry bandwidth allocation may be varied in response to needs or requests made by one or more operators. Still further, in a case where one or more downhole components fail, the telemetry bandwidth that would otherwise be utilized by these components can instead be used by the remaining operational downhole components.

The foregoing description and example apparatus and methods provided thereby are for purposes of illustration only and are not to be construed as limiting. Thus, although certain apparatus and methods have been described herein, the scope of coverage of this patent is not limited thereto. To the contrary, this patent covers all embodiments fairly falling within the scope of the appended claims either literally or under the doctrine of equivalents. Further, the term "comprising" within the claims is intended to mean "including at least" such that the recited listing of elements in a claim are an open group "A," "an," and other singular terms are intended to include the plural forms thereof unless specifically excluded.

What is claimed is:

1. A method of transmitting data between a downhole location in a wellbore and a surface location associated with the wellbore, the method comprising:
   measuring downhole data via at least one downhole component;
   generating a data frame containing at least a portion of the downhole data;
   varying a single channel telemetry bandwidth allocated to the at least one downhole component in response to the at least some of the downhole data corresponding to a special event; and
   altering an order of transmission of the at least some of the downhole data to the surface location via the telemetry bandwidth allocated to the at least one downhole component based on occurrence of the special event wherein the altering of the order of transmission is determined within the wellbore and wherein after the special event an original order of transmission of the at least some of the downhole data is resumed and wherein all transmission of data occurs on the single channel.

2. A method as defined in claim 1, wherein varying the telemetry bandwidth allocated to the at least one downhole component and altering the order of transmission of the at least some of the downhole data to the surface location comprises generating a special data frame and transmitting the special data frame to the surface location on a priority basis based on occurrence of the special event.

3. A method as defined in claim 2, wherein the transmitting of the special data frame to the surface location on a priority basis comprises transmitting the special data frame between periodically transmitted data frames.

4. A method as defined in claim 3, wherein the periodically transmitted data frames are of the same type of data frame.

5. A method as defined in claim 1, wherein generating the data frame containing at least some of the downhole data comprises encoding the data frame with identifying information.

6. A method as defined in claim 1, wherein generating the data frame comprises generating the data frame to include data from a predefined frame defined during configuration of a telemetry component.

7. A method as defined in claim 1, wherein the special event is in response to a command.

8. A method of transmitting data between a downhole location in a wellbore and a surface location associated with the wellbore, the method comprising:
   measuring downhole data via at least one downhole component;
   generating a data frame containing at least a portion of the downhole data;
   varying a telemetry bandwidth allocated to the at least one downhole component in response to the at least some of the downhole data corresponding to a special event; and
   transmitting the at least some of the downhole data to the surface location via the telemetry bandwidth allocated to the at least one downhole component wherein generating the data frame containing the at least the portion of the downhole data comprises associating at least one component number with each data point within the at least the portion of the downhole data.

9. A method as defined in claim 1, wherein the special event corresponds to an event requiring immediate attention by an operator.

10. An apparatus to transmit data between a downhole location in a wellbore and a surface location associated with the wellbore, the apparatus comprising:
   a telemetry component configured to vary a single channel telemetry bandwidth allocated to at least one downhole component in response to downhole data corresponding to a special event and to alter an order of transmission of at least some of the downhole data to the surface location via the telemetry bandwidth allocated to the at least one downhole component based on occurrence of the special event wherein the apparatus is configured to alter the order of transmission within the wellbore and wherein after the special event an original order of transmission of the at least some of the downhole data is resumed and wherein all transmission of data occurs on the single channel.

11. An apparatus as defined in claim 10, wherein the telemetry component is further configured to vary the telemetry bandwidth allocated to the at least one downhole component and alter the order of transmission of the at least some of the downhole data to the surface location by generating a special data frame and transmitting the special data frame to the surface location on a priority basis.

12. An apparatus as defined in claim 11, wherein the telemetry component is further configured to transmit the special data frame to the surface location on a priority basis by transmitting the special data frame between periodically transmitted data frames.

13. An apparatus as defined in claim 12, wherein the periodically transmitted data frames are of the same type of data frame.

14. An apparatus as defined in claim 10, wherein the special event is in response to a command.

15. An apparatus to transmit data between a downhole location in a wellbore and a surface location associated with the wellbore, the apparatus comprising:
   a telemetry component configured to vary a single channel telemetry bandwidth allocated to at least one downhole component in response to downhole data corresponding to a special event and to transmit the at least some of the downhole data to the surface location via the telemetry bandwidth allocated to the at least one downhole component wherein the telemetry component is configured to generate a data frame containing the at least the portion of the downhole data by associating at least one component number with each data point within the at least the portion of the downhole data wherein the apparatus is configured to alter the order of transmission within the wellbore and wherein after the special event an original order of transmission of the at least some of the downhole data is resumed and wherein all transmission of data occurs on the single channel.

16. An apparatus as defined in claim 10, wherein the special event corresponds to an event requiring immediate attention by an operator.

17. A method of transmitting data between a downhole location in a wellbore and a surface location associated with the wellbore, the method comprising:
   generating a plurality of data frames of a first type to be transmitted between the downhole location and the surface location;
   generating a data frame of a second type in response to detection of a special event; and
   altering an order of transmission of the at least one data frame of the second type ahead of transmission of data frames of the first type on a priority basis wherein the altering of the order of transmission is determined within the wellbore and wherein after the special event an original order of transmission of the at least some of the downhole data is resumed and wherein all transmission of data occurs on a single channel.

18. A method as defined in claim 17, wherein the special event is in response to a command.

19. A method as defined in claim 17, wherein the special event corresponds to an event requiring immediate attention by an operator.

20. A method as defined in claim 17, wherein the special event is associated with at least one of an alarm or an alert condition.

21. A method as defined in claim 17, further comprising transmitting the data frame of the second type from the downhole location to the surface location.

22. A method of transmitting data between a downhole location in a wellbore and a surface location associated with the wellbore, the method comprising:
   generating a plurality of data frames of a first type to be transmitted between the downhole location and the surface location;
   generating a data frame of a second type in response to detection of a special event; and
   transmitting the at least one data frame of the second type on a priority basis; wherein the data frame of the first type comprises a repeating data frame, and the data frame of the second type comprises a special data frame wherein an altering of the order of transmission is determined within the wellbore and wherein after a special event an original order of transmission of the at least some of the data frames is resumed and wherein all transmission of data occurs on a single channel.

23. A method of transmitting data between a downhole location in a wellbore and a surface location associated with the wellbore, the method comprising:
obtaining a sample of a fluid associated with an underground formation;
measuring one or more properties of the fluid sample with at least one downhole component;
generating a data frame containing information associated with the measured one or more properties;
measuring information of a special event;
selecting a telemetry bandwidth allocated to the at least one downhole component when the information corresponds to a special event;
generating a special data frame corresponding to properties measured from the special event; and
transmitting the information to the surface location via the allocated telemetry bandwidth wherein the transmitting the information to the surface location comprises altering a transmission of the data wherein the special data frame is transmitted to the surface location prior to information that is not in the special data frame wherein an altering of the order of transmission is determined within the wellbore and wherein after the special event an original order of transmission of the at least some of the data frames is resumed and wherein all transmission of data occurs on a single channel.

24. A method as defined in claim 23, further comprising: checking a state of a first of the one or more downhole components; and
determining that a fault condition exists for the special event when the state is representative of a fault.

25. A method as defined in claim 23, further comprising: checking a state of a downhole component associated with a drilling component; and
determining that a fault condition exists for the special event when the state is representative of a fault.

26. A method as defined in claim 23, further comprising: receiving a second data frame containing the information at the surface location, wherein the special event is detected at the surface location; and
sending the selected telemetry bandwidth to a downhole measuring component.

27. A method as defined in claim 23, wherein the telemetry bandwidth is selecting by a downhole component.

28. A method as defined in claim 23, wherein the special event corresponds to an event requiring immediate attention by an operator.

29. An apparatus to transmit data between a downhole location in a wellbore and a surface location associated with the wellbore, the apparatus comprising:
a fluid sampling component to measure one or more properties of an underground formation; and
a telemetry component configured to adjust a telemetry bandwidth allocated to the fluid sampling component in response to downhole data corresponding to a special event and alter an order of transmission of a portion of the downhole data based on occurrence of the special event wherein the apparatus is configured to alter the order of transmission within the wellbore and wherein after the special event an original order of transmission of the at least some of the downhole data is resumed and wherein all transmission of data occurs on a single channel.

30. An apparatus as defined in claim 29, wherein the telemetry component is configured to adjust the telemetry bandwidth allocated to the fluid sampling component and transmit the at least some of the downhole data to the surface location by generating a special data frame and transmitting the special data frame to the surface location on a priority basis.

31. An apparatus as defined in claim 29, wherein the telemetry component is configured to receive a command from the surface location, and the special event comprises the command.

32. An apparatus as defined in claim 29, wherein the special event corresponds to an event requiring immediate attention by an operator.

33. An apparatus to transmit data between a downhole location in a wellbore and a surface location associated with the wellbore, the apparatus comprising:
a fluid sampling component to measure one or more properties of an underground formation; and
a telemetry component configured to adjust a telemetry bandwidth allocated to the fluid sampling component in response to downhole data corresponding to a special event, wherein the telemetry component is configured to transmit at least some of the downhole data to the surface location via a telemetry bandwidth no longer allocated to transmission of fluid sampling component data wherein the apparatus is configured to alter the order of transmission within the wellbore and wherein after the special event an original order of transmission of the at least some of the downhole data is resumed and wherein all transmission of data occurs on a single channel.

34. An article of manufacture storing machine readable instructions which, when executed, cause a machine to:
obtain a sample of a fluid associated with an underground formation;
measure one or more properties of the fluid sample with at least one downhole component;
generate a data frame containing information associated with the measured one or more the properties;
measure information of a special event;
select a single channel telemetry bandwidth allocated to the at least one downhole component when the information corresponds to the special event;
generate a special data frame corresponding to properties measured from the special event; and
transmitting the information to the surface location via the allocated telemetry bandwidth, wherein the transmitting the information to the surface location comprises altering a transmission of the data wherein the special data frame is transmitted to the surface location prior to information that is not in the special data frame wherein the altering of the order of transmission is determined within the wellbore and wherein after the special event an original order of transmission of the at least some of the downhole data is resumed and wherein all transmission of data occurs on a single channel.

35. An article of manufacture as defined in claim 34, wherein the machine readable instructions, when executed, cause the machine to:
check a state of a first of the one or more downhole components; and determine that a fault condition exists when the state is representative of a fault.

36. An article of manufacture as defined in claim 34, wherein the machine readable instructions, when executed, cause the machine to:

check a state of a downhole component associated with a drilling component; and determine that a fault condition exists when the state is representative of a fault.

37. An article of manufacture as defined in claim 34, wherein the machine readable instructions, when executed, cause the machine to:

receive a second data frame containing the information at the surface location, wherein the special event is detected at the surface location; and send the selected telemetry bandwidth to a downhole measuring component.

* * * * *